United States Patent
Bianco

(10) Patent No.: US 8,767,075 B2
(45) Date of Patent: Jul. 1, 2014

(54) QUICK PASS EXIT/ENTRANCE INSTALLATION AND MONITORING METHOD

(75) Inventor: James S. Bianco, Suffield, CT (US)

(73) Assignee: Control Module, Inc., Enfield, CT (US)

( * ) Notice: Subject to any disclaimer, the term of this patent is extended or adjusted under 35 U.S.C. 154(b) by 390 days.

(21) Appl. No.: 12/957,938

(22) Filed: Dec. 1, 2010

(65) Prior Publication Data

US 2011/0128381 A1 Jun. 2, 2011

Related U.S. Application Data

(60) Provisional application No. 61/283,233, filed on Dec. 1, 2009.

(51) Int. Cl.
*H04N 9/47* (2006.01)
*H04N 7/18* (2006.01)
*G07B 15/02* (2011.01)

(52) U.S. Cl.
CPC . *H04N 7/18* (2013.01); *G07B 15/02* (2013.01)
USPC ........................................................ 348/149

(58) Field of Classification Search
USPC ................................................. 348/61–162
See application file for complete search history.

(56) References Cited

U.S. PATENT DOCUMENTS

| 6,262,764 | B1 * | 7/2001 | Perterson | 348/148 |
|---|---|---|---|---|
| 7,889,931 | B2 * | 2/2011 | Webb et al. | 382/209 |
| 8,089,340 | B2 * | 1/2012 | Cochran et al. | 340/5.7 |
| 2006/0114531 | A1 * | 6/2006 | Webb et al. | 359/15 |
| 2008/0040210 | A1 * | 2/2008 | Hedley | 705/13 |
| 2008/0211914 | A1 * | 9/2008 | Herrera et al. | 348/148 |
| 2010/0228608 | A1 * | 9/2010 | Hedley et al. | 705/13 |
| 2011/0313893 | A1 * | 12/2011 | Weik, III | 705/28 |
| 2012/0127308 | A1 * | 5/2012 | Eldershaw et al. | 348/143 |
| 2012/0140079 | A1 * | 6/2012 | Millar | 348/148 |
| 2012/0162423 | A1 * | 6/2012 | Xiao et al. | 348/148 |

* cited by examiner

*Primary Examiner* — Sath V Perungavoor
*Assistant Examiner* — Talha Nawaz
(74) *Attorney, Agent, or Firm* — Alix, Yale & Ristas, LLP

(57) ABSTRACT

A quick pass exit/entrance installation and method is particularly adaptable for controlling and monitoring the exit and return of vehicles to and from a secured area. The identification of the driver and the vehicle is automatically determined and the exiting transaction is undertaken while the driver remains seated in the vehicle. The vehicle VIN and the image of the license plate may be automatically obtained at both the exit and entrance lanes. An image of substantially all four sides of the vehicle may be automatically obtained on both exiting and entering the facility. The information is processed and receipts are issued while the driver remains seated in the vehicle.

18 Claims, 2 Drawing Sheets

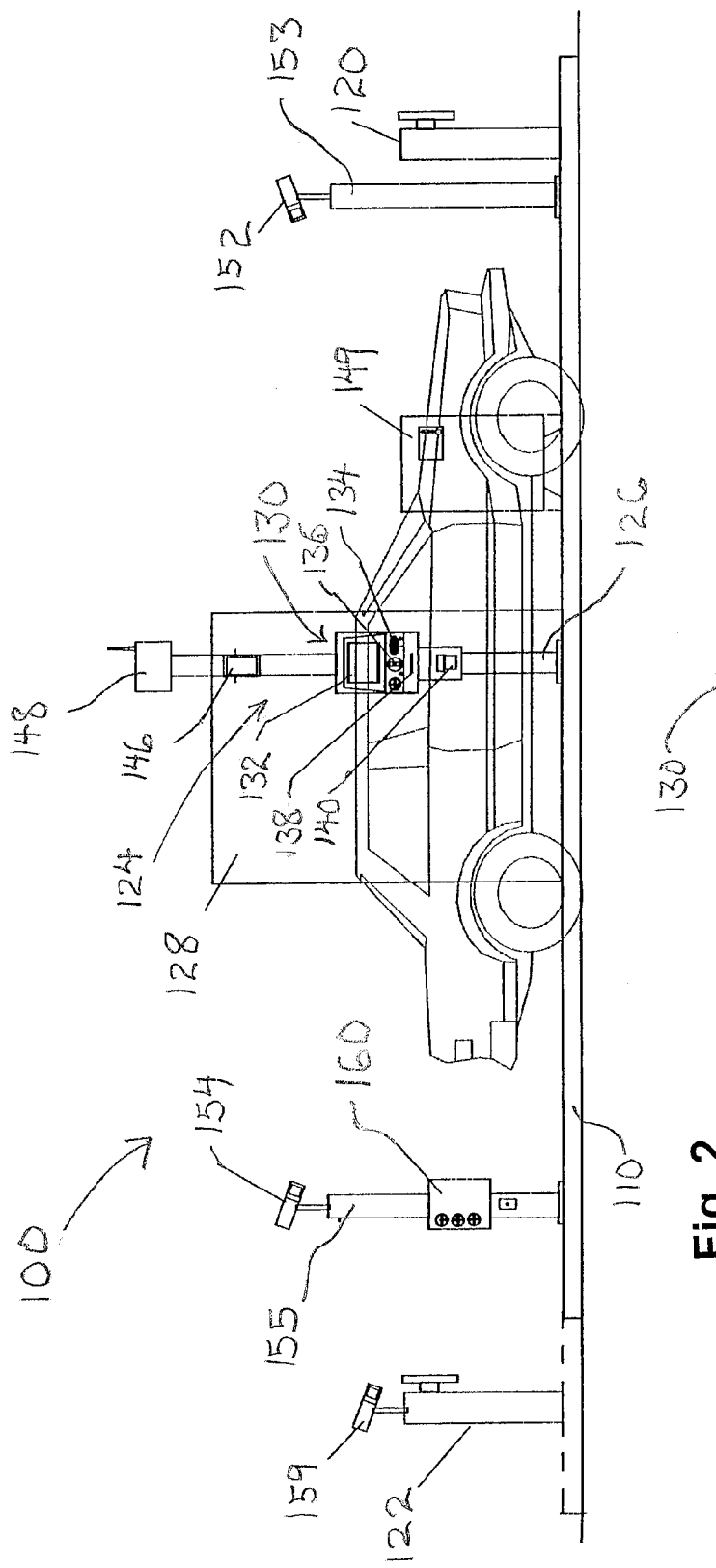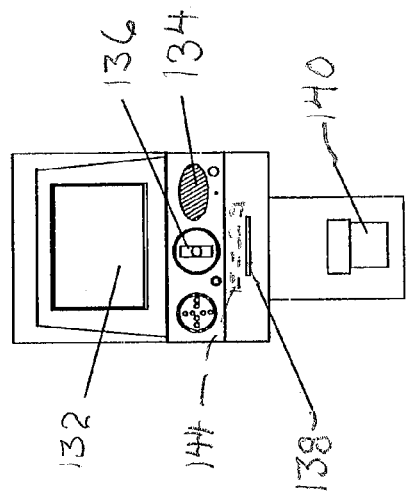

QUICK PASS EXIT/ENTRANCE INSTALLATION AND MONITORING METHOD

CROSS-REFERENCE TO RELATED APPLICATION

This application claims the priority of U.S. Provisional Patent Application No. 61/283,233 filed Dec. 1, 2009, the disclosure of which is incorporated herein in its entirety.

BACKGROUND

This disclosure relates generally to installations which provide for the controlled exit and entrance of vehicles. More particularly, this disclosure relates generally to automated systems which provide controlled exit and entrance to a facility for a fleet of vehicles.

In applications to which the present disclosure relates, such as vehicle leasing facilities, installations are provided to control the exit of the vehicle from the facility and also to control the entrance of the vehicle when it is returned to the facility. Numerous systems have been implemented for automatically controlling gates under various conditions. One of the recurring goals is to facilitate transactions for the leasing and return of the vehicle in an efficient and cost-effective manner with a minimal interaction with personnel of the leasing facility.

SUMMARY

Briefly stated, a quick pass exit/entrance installation comprises an exit lane with opposed exit sides and an exit gate and tail gate. An exit camera system comprises a front camera and a rear camera at each of the opposed exit sides. The camera system has a field of view which covers substantially the entirety of a vehicle disposed in the exit lane between the tail gate and the exit gate. An exit terminal is disposed at one exit side and has a video display, a driver image camera and a driver license reader. An exit reader electronically identifies the vehicle in the exit lane. The entrance lane has opposed entrance sides and a one-way gate. An entrance reader electronically identifies the vehicle in the entrance lane. An entrance camera system comprises a front camera and a rear camera at each of the opposed entrance sides and has a field of view which covers substantially the entirety of the vehicle disposed in the entrance lane between the entrance sides and the one-way gate.

The reader for reading the vehicle VIN is an RFID reader. A processor compares images from the exit and entrance camera systems. The exit terminal further comprises an intercom and a receipt printer. The exit reader comprises a reader for reading the vehicle VIN. The exit reader comprises a license plate reader. The entrance reader comprises a reader for reading the vehicle VIN. The entrance reader comprises a license plate reader. A processor processes information received from the exit terminal, the exit reader, the exit camera system, the entrance reader and the entrance camera system.

A method for monitoring vehicle egress from a secured area comprises reading a driver ID card at an electronic module adjacent an exit lane while the driver is seated in the vehicle. An image of the driver is recorded while the driver is seated in the vehicle. The information is displayed to the driver at the electronic module. The identification of the vehicle is automatically determined.

The method also comprises communicating via voice between an electronic module and the driver of the vehicle while the driver remains seated in the vehicle. The VIN of the vehicle is also read and an image of the vehicle license plate is obtained while the driver remains in the vehicle. An image of the vehicle is acquired from substantially all four sides while the vehicle is adjacent the electronic module. The information obtained is employed to determine whether egress from the facility is allowed and a signal is generated for opening at least an exit gate.

A method for monitoring the exit of a vehicle from a controlled facility and the return of the vehicle to the controlled facility comprises reading the ID of a driver in the vehicle while the vehicle is in an exit lane adjacent electronic module. An image of the driver is obtained while the driver is in the vehicle. The identification of the vehicle is automatically determined. An image of the vehicle is acquired while the vehicle is in the exit lane. The driver ID is read at an electronic module adjacent an entrance lane to the facility. The identification of the vehicle is automatically determined while the vehicle is in the entrance lane. An image of the driver is acquired while the vehicle is in the entrance lane. Information is processed to correlate the data upon exiting the secured facility to data acquired upon entering the secured facility.

The VIN of the vehicle is automatically read at the exit lane and at the entrance lane of the secured facility. An image of the vehicle license plate is automatically acquired while the vehicle is in the exit lane and at the entrance lane of the secured facility. Information is displayed at an electronic module adjacent the exit lane. Information is also displayed at an electronic module adjacent the entrance lane. A receipt is issued to the driver from an electronic module adjacent the exit lane. A receipt is also issued to the driver from an electronic module adjacent the entrance lane. Acquiring the image of the vehicle comprises acquiring an image from substantially all four sides of the vehicle. Information is processed to determine whether egress from the facility is allowed and to generate a signal for opening a gate across the exit lane.

BRIEF DESCRIPTION OF THE DRAWINGS

FIG. 2 is a side elevational view, partly in schematic, of a vehicle in an exit lane at an exit station of the facility of FIG. 1 with portions further being shown superimposed; and FIG. 3 is an enlarged elevational view of an exit terminal, for the exit station of FIG. 2.

DETAILED DESCRIPTION

Figure 1:
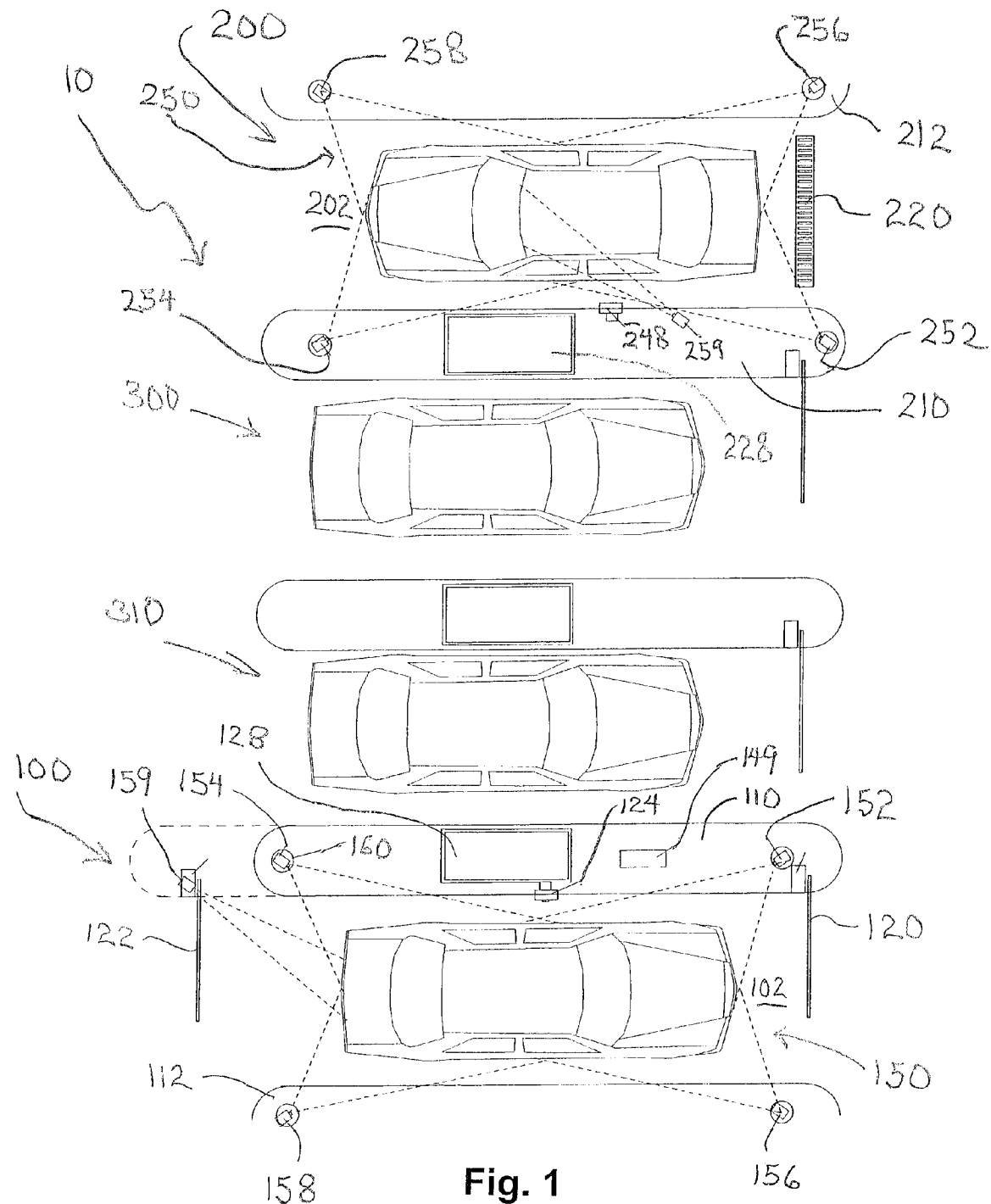
FIG. 1 is a top plan view, partly in diagram form and partly in schematic, of a quick pass exit/entrance installation.

With reference to the drawings wherein like numerals represent like parts throughout the figures, a quick pass exit/entrance installation is generally designated by the numeral 10. The installation comprises an exit station designated generally by the numeral 100, and an entrance station designated generally by the numeral 200. Various conventional stations such as stations 300 and 310 may also be provided.

The installation 10 functions to control the exit from and the entrance to a leasing facility in a highly automated, reliable and efficient manner without requiring interaction at the exit and entrance stations with personnel of the leasing facility. The installation 10 is also designed to reduce the transaction time and effort required of the operator/driver of the vehicle.

Exit station 100 includes an exit lane 102 which is interposed between two raised traffic medians 110 and 112. A motorized exit gate 120, which is automatically controlled, is disposed at the exit end of the exit lane. A motorized tail gate 122, which is automatically operated, is disposed at the rear of the exit lane 102. The exit station 100 is configured so that an operator may interact with a quick pass exit terminal 124 comprising a transaction module 130 which is mounted to a stanchion 126. The stanchion 126 is bolted or otherwise fixed to the median 110 approximately at the median middle adjacent the exit lane 102.

With additional reference to FIGS. 2 and 5, the module 130 is adapted to provide a user friendly transactional interface with the operator/driver of the vehicle while the driver remains seated within the vehicle. The module 130 includes a video display 132 and an intercom 134. The video display is configured for easy visual access by the driver. The intercom 134 provides two-way voice communication between the driver of the vehicle, while stopped at the exit station 100, and a person associated with the facility but located remotely from the exit station 100 and/or a computer which receives, responds to and transmits audio messages.

A driver image camera 136 is located at a medial height of the vehicle window so that as the vehicle stops to permit driver interaction with the module, the image of the driver of the vehicle may be automatically recorded. A driver's license reader having an access slot 138 is located so that the driver may insert his driver's license for scanning. A receipt printer 140 is disposed at a lower location so that it may be manually accessed by the driver to obtain a paper receipt.

The camera 136, license reader 138, receipt printer 140 and display 132 all communicate with a microprocessor 144. The microprocessor also communicates with an RF antenna 146. Data is communicated between the module 130 and a local server (not illustrated). An RFID reader module 148 is also mounted to the top of the stanchion 126 for reading the vehicle identification number ("VIN") from the vehicle and also ultimately communicating the VIN for processing.

A camera system 150 automatically obtains an image of all four sides of the vehicle as it is located in the exit lane. A front camera 152 is mounted at the front of the median 110. A rear camera 154 is mounted at the rear of median 110. The cameras are each mounted on posts 153 and 155, respectively, and are oriented to obtain a maximum field of view (schematically illustrated by the broken lines). In addition, a camera 156 is mounted to the front of median 112 and a rear camera 158 is mounted at the rear of median 112 so that simultaneous or synchronous images of the vehicle may be recorded and ultimately sent to the remote server.

A license plate camera 159 is preferably mounted to the motorized tail gate and angled so that the rear license plate of the vehicle may be automatically recorded. An anti-tail gate module 160 is mounted to the rear camera post 155.

It will be appreciated that the booth 128 on the median 110 may, essentially, be unattended when the exit station 100 is fully functional. A communication power cabinet 149 may be mounted to the median.

It will be appreciated that the foregoing described exit station 100 functions to allow a vehicle to be driven into the exit lane 102. The motorized tail gate 122 is initially raised and then lowered. The exit gate 120 is initially lowered to prevent egress. The driver of the vehicle then inserts the driver's license and observes the contract terms and other information on the display 132. A paper receipt of the transaction is available at the printer 140.

A significant portion of information and data is derived without driver or personnel action. The image of the driver is automatically recorded. In addition, the camera system 150 records a pre-travel image on all four sides of the vehicle which is correlated with the driver ID and the VIN for the vehicle which is obtained from the RFID reader module 148. The vehicle license plate is recorded by the license plate camera. All of the data and information is also transmitted by RF to a local server for processing and return communication. Upon completion of the transaction, the exit gate 120 is raised and the operator is free to drive the vehicle from the exit lane.

With reference to FIG. 1, the entrance station 200 includes a return lane 202 which is interposed between two raised traffic medians 210 and 212. A booth 228 is mounted to the median 110. Under fully functioning conditions, the booth 228 is normally unattended. A rhino-gate 220 is typically interposed in the return lane 202 to provide a one way gate to prevent a vehicle having once entered into the return or entrance station 200 from backing out from the entrance station.

A camera system 250 comprises a front camera 252 and a rear camera 254 mounted to the median 210. In addition, a front camera 256 and a rear camera 258 are mounted to median 212. As schematically indicated by the broken lines, the cameras are angled and oriented to provide a comprehensive four-side image of the returned vehicle upon entry of the vehicle into the entrance station. In addition an RFID reader 248 is mounted on a stanchion to read the VIN number of the vehicle. A license plate camera 259 is mounted to the median 210 to provide an image of the rear license plate of the vehicle.

It will be appreciated, that upon return of the vehicle, the camera system 250 takes an image of the returned vehicle that is compared to the original pre-travel image taken by camera system 150. The images are compared for purposes of assessing and documenting whether there has been any damage to the vehicle during the period the vehicle has been away from the installation. The return image is correlated with the VIN number read by the RFID reader 248, the license plate camera image 259 and the driver ID. The latter information and data is in turn processed and forwarded to the local server.

It will also be appreciated that numerous other conventional booths or additional exit stations 300, 310 and/or entrance stations may be provided as required for a given facility. The foregoing described installation 10 provides an efficient installation in which the transaction between the vehicle driver may essentially be completed and processed in a highly efficient process both upon initial leasing and upon return of the vehicle without direct interaction with personnel of the vehicle fleet agency.

The invention claimed is:

1. A quick pass exit/entrance installation to control the exit from and entrance to a facility comprising:
   an exit lane with opposed exit sides and an exit gate and a tail gate;
   an exit camera system having a field of view which entirely covers all four exterior sides of a vehicle disposed in said exit lane between said tail gate and said exit gate, wherein the exit camera system captures a pre-travel image of the vehicle;
   an exit terminal disposed at one exit side and having a video display, a driver image camera and a driver license reader;
   an exit reader for electronically identifying the vehicle in said exit lane;
   an entrance lane having opposed entrance sides and a one-way gate;
   an entrance reader for electronically identifying the vehicle in the entrance lane;
   an entrance camera system having a field of view which entirely covers all four exterior sides of a vehicle disposed in said entrance lane between said entrance sides and one-way gate, wherein the entrance camera system captures a second image upon return of the vehicle; and a processor wherein the pre-travel images from said exit camera system and the second image from said entrance camera systems are compared for a given the vehicle to assess damage to said vehicle.

2. The installation of claim 1 wherein at least one of said exit reader and said entrance reader is an RFID reader.

3. The installation of claim 1 wherein said exit terminal further comprises an intercom and a receipt printer.

4. The installation of claim 1 wherein said exit reader comprises a reader for reading the vehicle VIN.

5. The installation of claim 1 wherein said exit reader comprises a license plate reader.

6. The installation of claim 1 wherein said entrance reader comprises a reader for reading the vehicle VIN.

7. The installation of claim 1 wherein said entrance reader comprises a license plate reader.

8. The installation of claim 1 wherein said processor processes information received from said exit terminal, said exit reader, said exit camera system, said entrance reader and said entrance camera system.

9. The installation of claim 1 wherein said exit camera system comprises a front camera and a rear camera at each said opposed exit sides.

10. The installation of claim 1 wherein said entrance camera system comprises a front camera and a rear camera at each of said opposed entrance sides.

11. A method for monitoring the exit of a vehicle from a controlled facility and the return of the vehicle to the controlled facility comprising:
 (a) reading the ID of a driver in the vehicle while the vehicle is in an exit lane adjacent an electronic module;
 (b) obtaining an image of the driver while the driver is in the vehicle;
 (c) automatically determining the identification of the vehicle;
 (d) acquiring an image of the vehicle which images entirely encompasses all four exterior sides while the vehicle is in the exit lane; wherein the exit camera system captures a pre-travel image of the vehicle;
 (e) reading the driver ID at an electronic module adjacent an entrance lane to the facility;
 (f) automatically determining the identification of the vehicle while the vehicle is in the entrance lane;
 (g) acquiring an image of the vehicle while the vehicle which image entirely encompasses all four exterior sides while the vehicle is in the entrance lane; wherein the entrance camera system captures a second image upon return of the vehicle and
 (h) processing the information of steps (a)-(g) to correlate the data upon exiting the secured facility to data acquired upon entering the secured facility for a given vehicle; wherein the pre-travel images from said exit camera system and the second image from said entrance camera systems are compared for a given the vehicle to assess damage to said vehicle.

12. The method system of claim 11 further comprising automatically reading the VIN of the vehicle at the exit lane and the entrance lane of the secured facility.

13. The method of claim 11 further comprising automatically acquiring an image of the vehicle license plate while the vehicle is at the exit lane and at the entrance lane of the secured facility.

14. The method of claim 11 further comprising displaying information at the electronic module adjacent the exit lane.

15. The method of claim 11 further comprising displaying information at an electronic module adjacent the entrance lane.

16. The method of claim 11 further comprising issuing a receipt to the driver from an electronic module adjacent the exit lane.

17. The method of claim 11 further comprising issuing a receipt to the driver from an electronic module adjacent the entrance lane.

18. The method of claim 11 further comprising processing the information from steps (a)-(c) to determine whether egress from the facility is allowed and to generate a signal for opening a gate across the exit lane.

* * * * *